United States Patent [19]
Keidl

[11] 3,812,413
[45] May 21, 1974

[54] DRIVE CIRCUIT FOR INDUCTIVE LOAD

[75] Inventor: Steven Dennis Keidl, Rochester, Minn.

[73] Assignee: International Business Machines Corporation, Armonk, N.Y.

[22] Filed: Mar. 6, 1972

[21] Appl. No.: 232,095

[52] U.S. Cl. .............................. 318/696, 318/138
[51] Int. Cl. ......................................... G05b 19/40
[58] Field of Search ........... 318/138, 696, 685, 354, 318/432, 434

[56] References Cited
UNITED STATES PATENTS

| | | | |
|---|---|---|---|
| 3,728,602 | 4/1973 | Manabe | 318/696 |
| 3,577,176 | 5/1971 | Kreithen | 318/696 |
| 3,444,447 | 5/1969 | Newell | 318/696 |
| 3,452,263 | 6/1969 | Newell | 318/696 |
| 3,495,149 | 2/1970 | Swain | 318/138 |
| 3,412,307 | 11/1968 | Welsh | 318/394 |
| 3,290,573 | 12/1966 | Kamens | 318/171 |
| 3,560,829 | 2/1971 | Brennan | 318/599 |
| 3,453,514 | 7/1969 | Rakes et al. | 318/138 |
| 3,197,685 | 7/1965 | Hetzel | 318/138 |
| 3,560,817 | 2/1971 | Amato | 318/138 |

Primary Examiner—G. R. Simmons
Attorney, Agent, or Firm—Carl W. Laumann, Jr.

[57] ABSTRACT

A drive circuit for an inductive load is described which has particular use for stepping motors. A high voltage power supply is connected through a very low impedance directly to the inductive load to provide a fast rise time for the load current. When the current exceeds a predetermined value, the load is disconnected from the power supply. The current induced in the load due to flux decay is permitted to circulate through the load and a current sampling circuit. When the induced current drops below a minimum value, the load is again connected to the power supply for a period sufficiently long to allow restoration of the load current to the desired value.

The circuit utilizes two switches to control the flow of induced current and connection of the load to the power supply. Both switches respond to a logic signal indicating that the load is to be energized. One switch is used to control the induced current and the other is used to make the connection to the power supply.

4 Claims, 5 Drawing Figures

DRIVE CIRCUIT FOR INDUCTIVE LOAD

BACKGROUND OF THE INVENTION

1. Field of the Invention

This invention relates to semiconductor circuits used to energize inductive loads. It is directed particularly to circuits for the bidirectional excitation of stepping motor drive windings.

2. Description of the Prior Art

The problem of obtaining a short rise time in the current supplied to an inductive load has been addressed many times. Solutions to this problem are generally inconsistent with the steady state requirements for the same load. While the load impedance is quite high at the outset, it becomes very low once a steady state condition is reached. For this reason if a high voltage is applied to obtain a short rise time, the current rises to an unacceptably high value as the load impedance decreases.

Typical solutions existant in the prior art involve the use of a switch in parallel with a series dropping resistor. When the load is to be energized, the switch is closed to bypass the dropping resistor and apply the full voltage from the power supply to the load. When the load current has risen to the desired value, the switch is opened to place the dropping resistor in the circuit. The resistor prevents the load current from reaching an excessive value.

More sophisticated solutions have involved additional windings on the load. This permits selective switching of the windings from a parallel to series connection to accommodate the change in impedance.

In certain stepping motor applications, it has been found possible, by means of diode switching, to add the induced voltage in the de-energized windings to the next energized winding.

Still another solution involves the use of dual power supplies. A high voltage supply is used for the first portion of the cycle in order to obtain the requisite fast rise of current. Sustained excitation of the load comes from a low voltage power supply.

While these solutions are generally satisfactory in terms of stepping motor performance, they present other difficulties. Extra windings on the motor tend to increase the cost. The same is true for the use of dual voltage power supplies. Another problem, not obvious from a circuit description, is the heat dissipation which results from the use of dropping resistors and similar devices. Thus, while the desired stepping motor performance has been achieved by prior art solutions, it has been accomplished at the expense of other parameters.

SUMMARY

It is therefore an object of the invention to provide an improved circuit for energizing inductive loads. Other objects of the invention include the provision of a stepping motor drive circuit with reduced heat dissipation, bidirectional current capability and overcurrent protection while retaining the ability to achieve a fast current rise time by application of the full power supply voltage to the load.

The foregoing and other objects, features and advantages of the invention will be apparent from the following more particular description of preferred embodiments of the invention, as illustrated in the accompanying drawings.

DESCRIPTION

Figure 1:
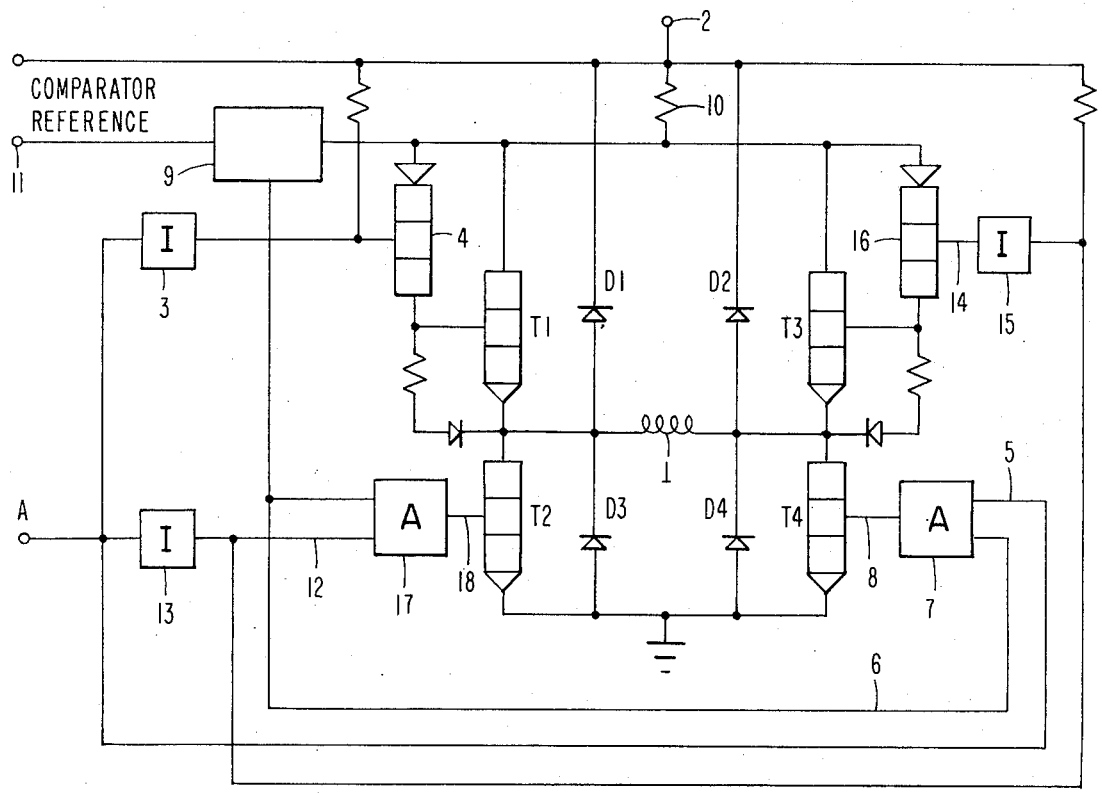
FIG. 1 is a simplified schematic drawing of a circuit embodying the invention.

The circuit shown in FIG. 1 provides for the reversible excitation of a stepping motor drive winding 1 from a power supply connected to terminal 2. When the signal applied to input terminal A is at the HIGH level, indicating that winding 1 is to be energized with current in a first direction, transistors T1 and T4 are placed in the conductive state. Transistor T1 conducts because the input signal at terminal A is lowered by inverter 3 to forward bias the base of transistor 4 to provide base current to transistor T1. Conduction through transistor T4 results because both inputs 5 and 6 to AND gate 7 are high, giving rise to a high output on conductor 8, which provides base current to transistor T4.

The signal level on line 6 is controlled by comparator 9 which is effective to provide a high level when the voltage drop across current sampling resistor 10 is less than the voltage as referenced to line 2 applied to comparator reference terminal 11.

A conductive path is thus established from power supply terminal 2 through current sampling resistor 10, transistor T1, winding 1 and transistor T4 to ground. Conduction through transistor T3 is blocked since the output line 12 of inverter 13 is low. This causes the output line 14 of interver 15 to be high to block conduction through PNP transistor 16. Output line 12 also holds the output of AND gate 17 on line 18 at a low level to block conduction through transistor T2.

Assume now that the input signal at terminal A changes to the low level, indicating that the current through winding 1 is to be reversed. Transistor T1 and T4 are cut off since the input to their respective bases drops to a low level. Transistor T3 and T2 enter the conductive state since their respective bases are at a high level. This establishes a conductive path through resistor 10, transistor T3, winding 1 and transistor T2.

Figure 2:
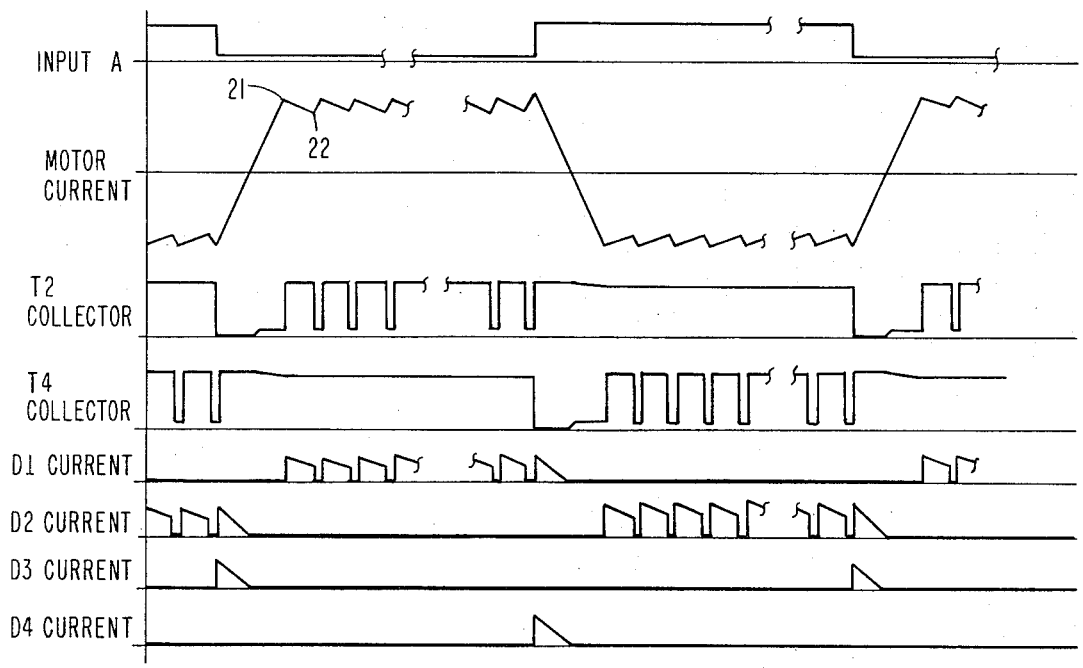
FIG. 2 is a drawing which portrays the waveforms found at various points in the circuit of FIG. 1.

The waveforms in FIG. 2 illustrate the effect at various points in the circuit. After the high level signal at input terminal A drops to a low level, the motor current in winding 1 begins to decrease. Transistor T2 is forward biased, but conducts no current until the current in winding 1 has dropped to zero and reversed. The collector voltage of transistor T4 rises since it is now in the non-conductive state. Current flows briefly through diodes D2 and D3 because of the reverse voltage induced in winding 1 by the collapsing flux.

Because of the inductance of winding 1, the current requires a finite time to change to the desired level. The time required to reach the peak value is short since the entire voltage at terminal 2 is applied across winding 1. This decreases both the time to reduce the current to zero and increase it to the desired value of opposite polarity. The voltage drop across transistor T3 and T2 is small compared to the supply voltage. Similarly, the ohmic value of current sampling resistor 10 is less than 1 ohm so that the voltage drop across this component is minimal and may be ignored.

At the point when the signal across the current sensing resistor 10 exceeds the reference voltage at terminal 11, the output of comparator 9 drops to a low level. This has the effect of deconditioning AND gate 17 to cause the signal on line 18 to drop to a low level and place transistor T2 in the non-conductive state. This is point 21 on the motor current waveform of FIG. 2.

When transistor T2 enters the non-conductive state, the collapsing flux of winding 1 induces a voltage across the winding which forward biases diode D1. This establishes a conductive path through diode D1, current sampling resistor 10 and transistor T3, which remained in the conductive state since it is controlled solely by the output of inverters 13 and 15. Due to this low resistance conductive path, the collapsing flux maintains a slowly decreasing current flow in winding 1. This is shown by the downward slope of the motor current waveform from point 21 to point 22.

When the current through winding 1 and resistor 10 has decreased to the value illustrated at point 22, the signal across resistor 10 drops to a value below that of the reference voltage between terminals 11 and 2. This causes the output signal of comparator 9 on line 6 to switch to the high level and again place transistor T2 in the conductive state. Current in winding 1 then increases again until the turn off point of comparator 9 is reached.

It is desirable that comparator 9 have some hysteresis, that is, the output signal should be present for a higher signal across resistor 10 as the signal is increasing, than is required to restore the output signal when the signal is decreasing. This effect can be obtained with conventional level detection circuits such as Schmitt triggers. It can also be provided with timing circuits in the comparator or in the AND gates associated with transistor T2 and T4.

If the timing circuit is placed in comparator 9, it would be effective to restore the output signal on line 6 a predetermined interval after the comparator had detected an excessive signal across resistor 10. This interval would be selected to provide the desired current decay in winding 1 taking into consideration the inductance, resistance and capacitance of the discharge circuit as well as the original and terminal current values.

Figure 3:
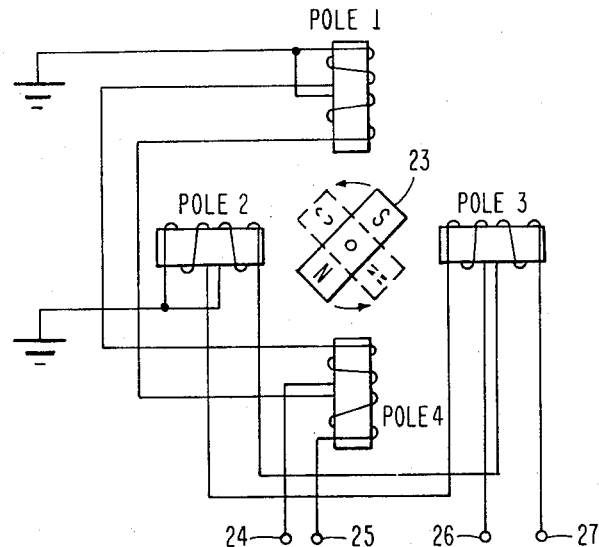
FIG. 3 is a schematic drawing of the winding polarity and armature of a stepping motor.
Figure 4:
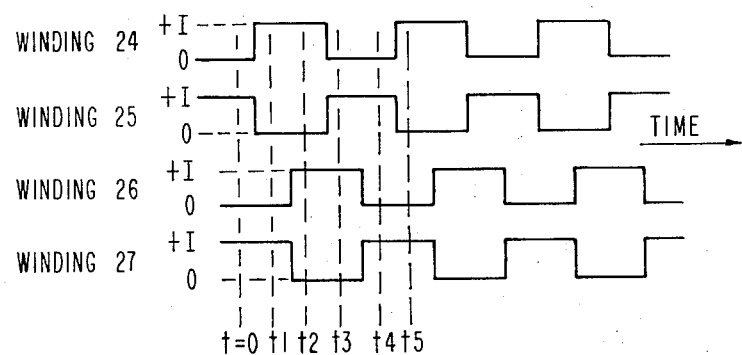
FIG. 4 is a timing diagram showing the sequence of excitation of the stepping motor windings shown in FIG. 3.

Application of this circuit to a specific stepping motor is easily accomplished. FIG. 3 is a very simplified representation of a typical stepping motor showing polarity of rotor 23 and the fashion in which the stator is wound. The motor has four windings, identified by terminals 24, 25, 26 and 27. The sequence and polarity of excitation current for rotation as shown is set forth in FIG. 4. Each of the windings is driven with current according to the polarity shown in FIG. 4. The current flowing in the windings will follow the waveform of the motor current shown in FIG. 2.

From this drawing it can be seen that the effect produced by de-energizing winding 24 and energizing winding 25 can also be achieved by ignoring winding 25 and simply reversing the current through winding 24. This techinque is made possible by the reversible current driver of this invention.

Figure 5:
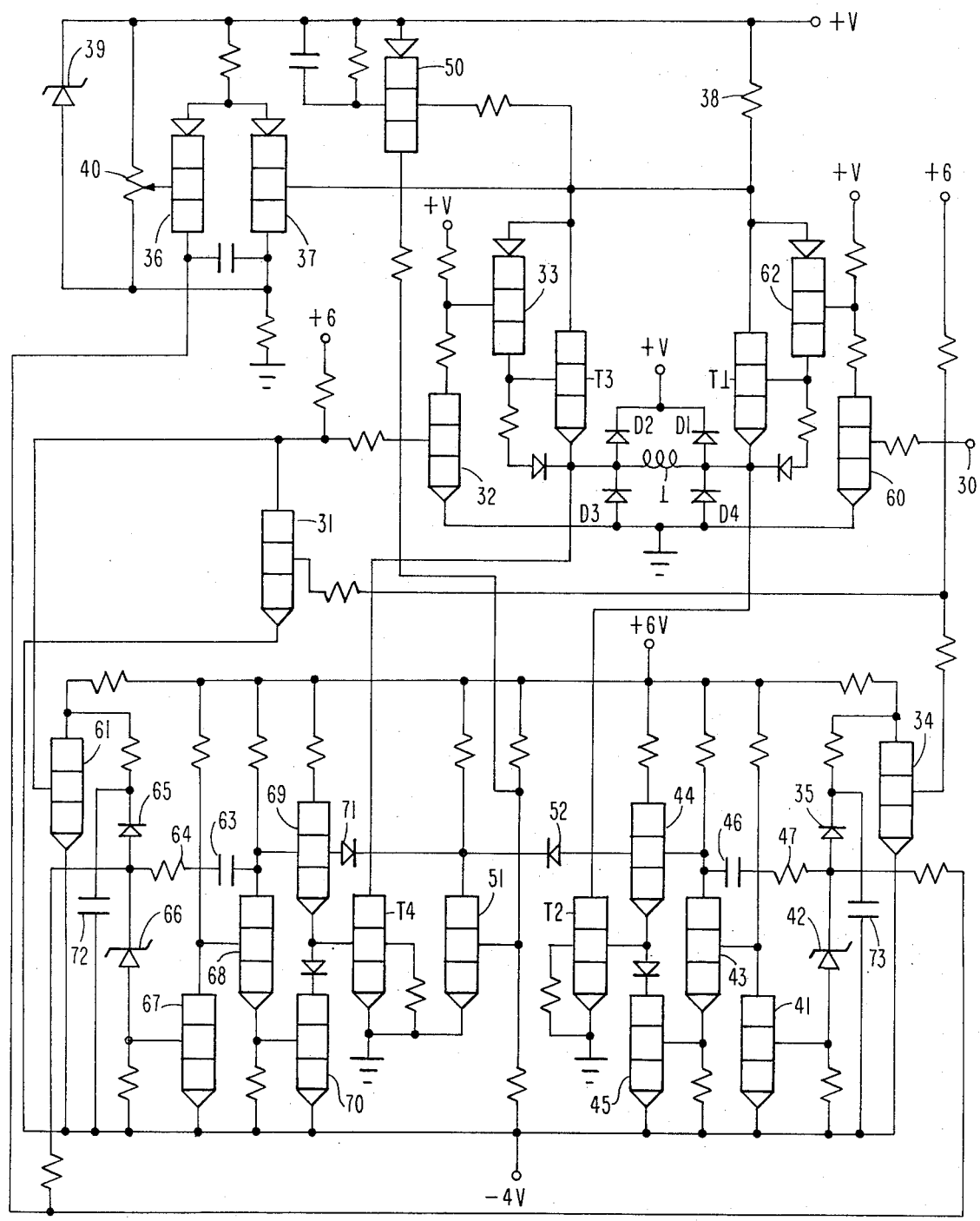
FIG. 5 is a detailed schematic drawing of the circuit utilized to provide bidirectional excitation of a stepping motor drive winding.

There are certain similarities between the detailed embodiment shown in FIG. 5 and the more generalized showing of FIG. 1. To permit a simpler comparison of the two versions, the primary transistors T1–T4 in FIG. 1 have been given the same reference characters in FIG. 5. Diodes D1–D4 have been treated in the same fashion, as has winding 1. While certain other components in FIG. 5 perform functions similar to that of the corresponding compartment in FIG. 1, the use of identical reference characters has been limited to those mentioned to avoid confusion.

When the input signal to terminal 30 is LOW, indicating that the inductive load in the form of winding 1 is to be energized in a first direction, transistors T3 and T2 are placed in the conductive state. A low level at terminal 30 causes transistor 31 to be cut off which in turn places transistor 32 in the conductive state. Since both transistors 31 and 32 function as inverters, they are equivalent to the direct connection of input terminal 30 to the base of PNP transistor 33. The low signal is effective to turn on transistor 33 to provide the base current necessary to place transistor T3 in the conductive state.

At the same time, the low signal at terminal 30 is effective to cut off transistor 34 causing the output voltage at the collector of transistor 34 to rise to a high positive value and back bias diode 35. This diode serves as an AND gate in combination with transistor 34 to combine the output of the comparator, made up of transistor 36 and 37, with the signal at terminal 30. Since the current through inductive load winding 1 was assumed to be low at the moment of application of the low level signal to terminal A, the voltage drop across current sensing resistor 38 will also be small. In this situation the reference voltage applied to the base of transistor 36 will be greater than the voltage at the base of transistor 37 and transistor 36 will be in the conductive state. The reference voltage is developed by a zener diode 39 across potentiometer 40 to permit the firing point of the comparator to be adjusted to the desired value of current flow through resistor 38.

When transistor 36 is in the conductive state and transistor 34 is cut off to back bias diode 35, the AND function is satisfied and transistor 41 is placed in the conductive state. Zener diode 42 is used as a level translator to eliminate forward bias on transistor 41 which would otherwise exist when transistor 34 is in the conductive state. When transistor 41 conducts, it cuts off transistor 43, which serves as a driver for the totem pole connection of transistors 44 and 45. Transistor 43 thereby cause transistor 44 to go into the conductive state and cuts off transistor 45. The resulting flow of current through transistor 44 causes transistor T2 to enter the conductive state.

The connection from the power supply terminal through current sensing resistor 38, transistor T3 (first switch means), load winding 1 and transistor T2 (second switch means) to the ground potential is thereby accomplished. At some point in time the load current through this path will increase to a value which results in a signal voltage across resistor 38 in excess of the comparator reference voltage at the base of transistor 36. The time required for the current to rise to this value is determined largely by the inductance of winding 1.

When the voltage at the base of transistor 37 exceeds the voltage at the base of transistor 36, the output signal from transistor 36 is cut off to terminate the base current supply to transistor 41. This has the effect of cutting off transistor 41 and places transistor 43 in the conductive state. The state of totem pole connection of transistor 44 and 45 is reversed, with transistor 45 in the conductive state and transistor 44 cut off. This also cuts off transistor T2.

Current in winding 1 immediately begins to decrease and the collapsing flux induces a voltage across winding 1 tending to sustain the current flow. The polarity of this voltage results in conduction through diode D1 to establish a conductive path through diode D1, current sampling resistor 38, and transistor T3 to winding 1. Since the cut off of transistor T2 results in an immediate decrease in the current flowing through winding 1 and current sensing resistor 38, the output signal from transistor 36 will be restored immediately. Despite the fact that transistor 36 is restored to the conductive state transistor T2 will be held cut off for a period of time.

When current begins to flow through transistor 36 it will be unable to raise the potential at the base of transistor 41 until the delay capacitor 46 has been charged. Capacitor 46 and resistor 47 form a delay circuit which provides the hysteresis necessary to obtain the saw tooth on the motor current waveform shown in FIG. 2. This resistor-capacitor combination also provides regenerative feedback once transistor 41 has started to change state to assure rapid switch action.

A protective circuit is included to prevent damage in the event that current through transistor T1–T4 rises to an unsafe value due to race conditions caused by the variation in switching speeds of these transistors. If the current rises to an excessively high value, the voltage across resistor 38 becomes sufficient to place transistor 50 in the conductive state. When this occurs, the current flow through transistor 50 raises the voltage at the base of transistor 51 to put this transistor into the conductive state.

Since the collector of transistor 51 is connected to the base of transistor 44 by means of diode 52, transistor 44 will be robbed of base current to reduce the drive available to the base of transistor T2. In this fashion, the maximum current through transistor T2 can be limited to a safe value. The circuit also protects the transistors T1–T4 in the event that the —4 Volt power supply is lost.

When the signal at terminal 30 rises to the high level, indicating that current in winding 1 is to be reversed, transistor T3 and T2 are placed in the non-conductive state and transistors T1 and T4 are biased into conduction.

The high level signal at terminal 30 causes the output of transistor 31 to drop to a low level which cuts off transistor 32. The base of transistor 33 is thus reversed biased by the voltage drop across resistor 38 and therefore base current is removed from transistor T3. The high level signal at terminal 30 also causes the output of transistor 34 to drop to a low level which cuts off transistor 41. The resulting high level at the base of transistor 43 places this transistor in the conductive state. This causes transistor 45 to conduct and cut off transistor T2.

With the drive now removed, the stored energy of winding 1 is dissipated through the power supply via diodes D1 and D4. This is shown in FIG. 2. The speed of the associated current decay is enhanced by the potential of the power supply.

Transistor 60 is biased into conduction by the high level at terminal 30. Conduction through transistor 60 is effective to supply base current to transistor 62 and place the latter in the conductive state. When transistor 62 conducts, it places transistor T1 in the conductive state.

The low level signal at the output of transistor 31 operates to cut off transistor 61. Since the current through winding 1 has decreased, there is an output signal from transistor 36 which begins to charge the resistance capacitance network of resistor 63 and capacitor 64. The current from transistor 36 can accomplish this changing because diode 65 is back biased by the high level at the output of transistor 61.

When the charging of capacitor 63 has reached the point where the voltage, as translated by the level shifting zener diode 66, at the base of transistor 67 places the latter in the conductive state, transistor 68 is cut off. This results in regenerative feedback through resistor 64 and capacitor 63 to speed the transition. The state of transistors 69 and 70 is thereby reversed so that transistor 69 conducts and transistor 70 is cut off. The conduction through transistor 69 supplies base current to transistor T4 to place it in the conductive state.

A circuit is thereby established from the power supply terminal through resistor 38 transistor T1, winding 1 and transistor T4 to ground, which is effective to reverse the current through winding 1.

Over current limiting for transistors T1 and T4 is accomplished by the current sensing transistor 50, transistor 51 and diode 71 in the same fashion as for transistors T2 and T3.

Capacitors 72 and 73 provide some turn on delay to accommodate the different switching times between transistors T1, T3, and T2, T4.

While the invention has been particularly shown and described with reference to preferred embodiments thereof, it will be understood by those skilled in the art the foregoing and other changes in form and details may be made therein without departing from the spirit and scope of the invention.

What is claimed is:

1. A circuit for energizing a stepping motor drive winding from a low impedance power supply comprising:

a terminal means for receiving a signal indicating that the winding is to be energized;

first switch means in series circuit with said winding;

means connecting said first switch means to said terminal means to place said first switch means in a conductive state in response to said signal;

diode means connecting said winding and said first switch means in circuit to provide a conductive path through said first switch means for the current induced in said winding upon disconnection from said power supply;

second switch means connecting said winding to said power supply;

current sensing means in circuit with said drive winding for developing a signal indicating current greater than a predetermined magnitude in said winding; and control means for said second switch means, means connecting said current sensing means signal to said control means to open said second switch in response to said signal;

said control means for said second switch means including means for connecting said control means to said terminal means to close said second switch in response to the simultaneous existence of the signal indicating that the current in said winding is less than a predetermined magnitude.

2. A bidirectional drive circuit for a stepping motor winding comprising:

a bridge circuit comprising first, second, third and fourth transistors means connecting said first and second transistors in series circuit, means connecting said third and fourth transistors in series circuit, means connecting a stepping motor winding from the junction of said first and second transistors to the junction of said third and fourth transistors, current sensing means connecting said first and third transistors to a power supply, comparator means coupled to said current sensing means for developing output signals indicating more or less than a predetermined value of current is flowing in said winding, terminal means for receiving first or second signals indicating that the winding is to be energized with current in first or second directions respectively, control means for said first transistor to place said transistor in the conductive state in response to said first signal, control means for said third transistor to place said transistor in the conductive state in response to said second signal, control means for said fourth transistor to place said transistor in the conductive state in response to the simultaneous existence of said first signal and the output signal from said comparator means indicating that less than a predetermined value of current is flowing in said winding, control means for said second transistor to place said transistor in the conductive state in response to the simultaneous existence of said second signal and the output signal from said comparator means indicating that less than a predetermined value of current is flowing in said winding, first and second diode means respectively connected in parallel circuit with a first circuit comprising said current sensing means, said winding and said first transistor and a second circuit comprising said current sensing means, said winding and said third transistor in a sense to oppose the flow of current from said power supply.

3. A system according to claim 2 further including, overcurrent detection means connected to said current sensing means for developing a signal indicating excessive current flowing in said winding, current limit means connected to the overcurrent detection means and to the control means for said second and fourth transistors to limit the current passed by said second and fourth transistors in response to the signal indicating excessive current flowing in said winding.

4. A system according to claim 2 wherein, said control means for said second and fourth transistors includes a timing circuit in the control means for both said second and fourth transistors to hold said second and fourth transistors non-conductive in the state a predetermined time after the output signal from the comparator means has reappeared following an output signal indicating more than a predetermined current in said winding.

* * * * *